No. 692,090. Patented Jan. 28, 1902.
G. S. TURNER.
VEHICLE WHEEL.
(Application filed July 3, 1901.)
(No Model.)

Witnesses:
Inventor
G. S. Turner.

UNITED STATES PATENT OFFICE.

GEORGE S. TURNER, OF BEAVERFALLS, PENNSYLVANIA.

VEHICLE-WHEEL.

SPECIFICATION forming part of Letters Patent No. 692,090, dated January 28, 1902.

Application filed July 3, 1901. Serial No. 67,018. (No model.)

*To all whom it may concern:*

Be it known that I, GEORGE S. TURNER, a citizen of the United States of America, residing at Beaverfalls, in the county of Beaver and State of Pennsylvania, have invented certain new and useful Improvements in Vehicle-Wheels, of which the following is a specification, reference being had therein to the accompanying drawings.

This invention relates to certain new and useful improvements in wheels for vehicles, and relates more particularly to wheels for light vehicles, such as buggies, phaetons, runabouts, automobiles, and other light vehicles.

The present invention has for its object the provision of novel means whereby the load or strain upon the wheel will be equalized; furthermore, to provide novel means that will take up the jar and jolting movement incident to uneven surfaces in the path of travel or road.

My invention further aims to construct a wheel that will admit the vehicle-body to be mounted directly thereon and will dispense with the lap-springs secured and interposed between the body portion of the vehicle and the axles.

A still further object of my invention is to construct a wheel of the above type that will be extremely flexible; furthermore, one that will be simple in construction, strong, durable, comparatively inexpensive to manufacture, and highly efficient in its operation.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1:
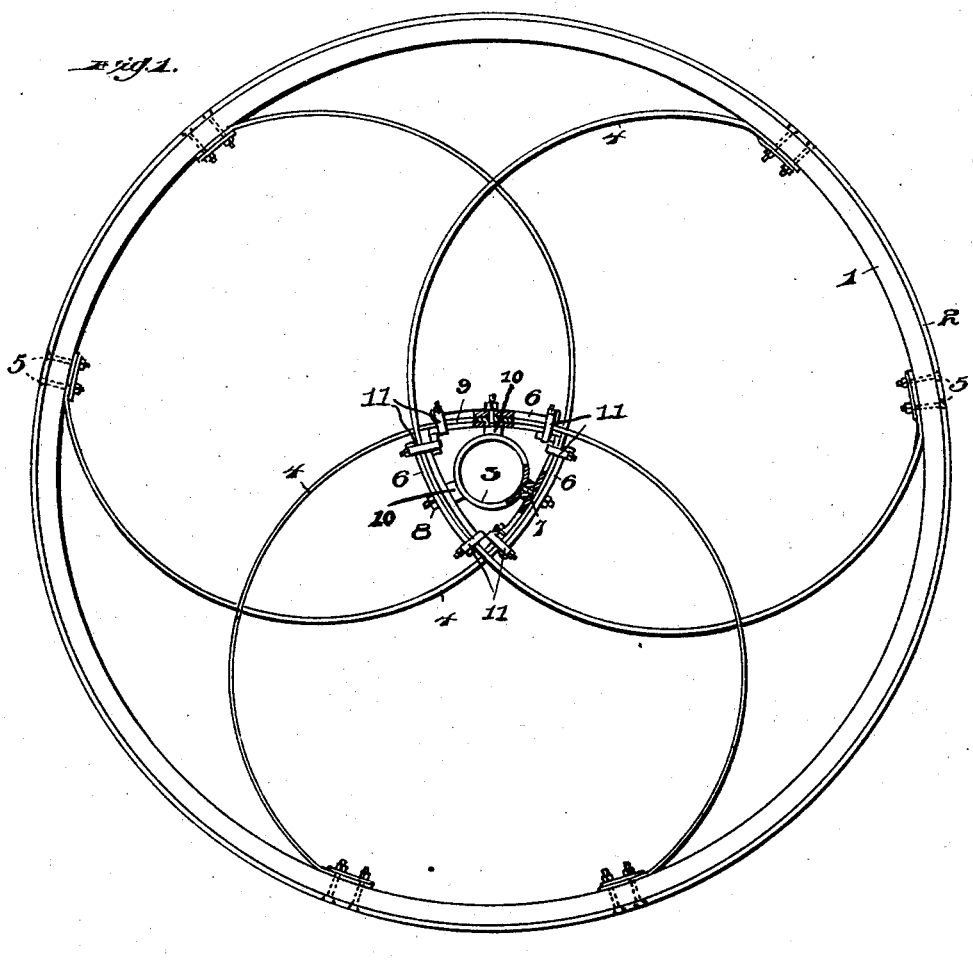
Figure 2:
Figure 3:
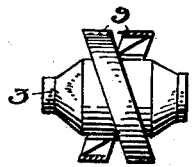

Figure 1 is a side elevation of my improved wheel. Fig. 2 is a detail view of one of the springs. Fig. 3 is a side view of the hub, showing the springs attached thereto.

In the practical embodiment of my invention I provide the felly 1 of the wheel on its inner circumference with a series of springs 4 in the form of an incomplete circle, having their ends rigidly secured to the felly at intermediate points thereon. To the hub 3 of the wheel is securely fastened, by means of bolts 7 and nuts 8, a series of clips 6, composed of two plates, one of which is secured to the inner circumference and the other of which is secured to the periphery of the springs 4. A washer 10 is interposed between the periphery of the hub and the inner clip, through which the bolt 7 passes. To the ends of the clips 6 are secured clamps 11.

The springs 4 are formed in a manner as shown in Fig. 2 of the drawings, carrying a central connecting-strip 9 to receive the clips 6. By this construction the springs are enabled to pass one another and further serve as fastening means to the hub.

It will be seen that the springs instead of carrying free ends that are fastened to the felly may be joined together, in which fastened manner one fastening for each spring would be required, and that various other changes may be made in the details of construction without departing from the general spirit of my invention.

Having fully described my invention, what I claim as new, and desire to secure by Letters Patent, is—

1. In a spokeless wheel, the combination of a felly and a hub, of springs in the form of an incomplete circle secured to the felly, said springs encircling said hub, means secured to the periphery and inner circumference of said springs, and means for securing said means to the hub, substantially as described.

2. In a spokeless wheel comprising a felly and hub, the combination of intersecting springs in the form of an incomplete circle secured to said felly, and means carried by said springs for securing the same to the periphery of the hub, substantially as described.

3. In a spokeless wheel, the combination of a felly and hub, of a series of springs in the form of an incomplete circle, each spring having its ends secured to said felly, clips carried by said springs, means for securing the clips, means for securing the said clips and spring to the hub, and means interposed between said clips and the hub, substantially as described.

In testimony whereof I affix my signature in the presence of two witnesses.

GEORGE S. TURNER.

Witnesses:
JOHN NOLAND,
E. E. POTTER.